United States Patent [19]
Jung

[11] Patent Number: 5,829,852
[45] Date of Patent: Nov. 3, 1998

[54] LIQUID CRYSTAL PROJECTOR HAVING IMPROVED COLOR UNIFORMITY

[75] Inventor: Myung-ryul Jung, Suwon, Rep. of Korea

[73] Assignee: Samsung Electronics Co., Ltd., Kyungki-Do, Rep. of Korea

[21] Appl. No.: 707,238

[22] Filed: Sep. 3, 1996

[30] Foreign Application Priority Data

Oct. 30, 1995 [KR] Rep. of Korea .................. 1995-38239

[51] Int. Cl.$^6$ .................................................. G03B 21/14
[52] U.S. Cl. .................. 353/20; 353/31; 353/34
[58] Field of Search .................................. 353/20, 31, 33, 353/34, 37; 349/87, 96, 98, 5; 348/752, 751, 757, 762

[56] References Cited

U.S. PATENT DOCUMENTS

| | | | |
|---|---|---|---|
| 5,374,968 | 12/1994 | Haven et al. | 353/20 |
| 5,486,884 | 1/1996 | De Vaan | 353/20 |
| 5,541,673 | 7/1996 | Shioya et al. | 353/20 |
| 5,575,548 | 11/1996 | Lee | 353/31 |

FOREIGN PATENT DOCUMENTS 2151848  6/1990  Japan ...................................... 353/20

*Primary Examiner*—William Dowling
*Attorney, Agent, or Firm*—Sughrue, Mion, Zinn, Macpeak & Seas, PLLC

[57] ABSTRACT

The color uniformity of a liquid crystal projector is improved by introducing phase lag plates. The light beam from a light source is first passed through a phase lag plate and only then through the liquid crystal element. In this manner, the phase lag plate introduces rotational polarization so that the S-polarized light is aligned throughout the entire beam front. Optionally, the image can be further improved by introducing a cold mirror to intercept the ultraviolet rays and a hot mirror to intercept the infrared rays.

5 Claims, 4 Drawing Sheets

P-POLARIZED COMPONENT

S-POLARIZED COMPONENT

DIRECTION OF POLARIZATION

LIQUID CRYSTAL PROJECTOR HAVING IMPROVED COLOR UNIFORMITY

BACKGROUND OF THE INVENTION

The present invention relates to a liquid crystal projector, and more particularly, to a liquid crystal projector having improved color uniformity by using phase lag plates.

In general, a liquid crystal projector comprises a light source and a plurality of dichroic mirrors that selectively reflect/transmit the light emitted from a light source according to wavelength. The reflected/transmitted light is passed through several liquid crystal display devices, each forming a picture in response to electrical current applied thereto. After passing through the various liquid crystal display devices, the light is recombined and the resulting image is magnified and projected onto a screen.

The structure of a conventional liquid crystal projector will be further explained with reference to FIG. 1A and 1B. The light from a light source 11 is divided into several beams by a plurality of dichroic mirrors 12a, 12b, 12c and 12d. The dichroic mirrors selectively reflect/transmit the light depending on the wavelength, and thereby separate the light into red (R), green (G) and blue (B) beams, or into yellow (Y), cyan (C) and magenta (M) beams. A plurality of reflecting mirrors 13a and 13b are used for changing the optical path of the light beams. The liquid crystal display devices 14a, 14b and 14c are positioned between the dichroic mirrors 12a and 12c, 12b and 12c, and 12b and 12d, respectively, for forming pictures corresponding to red, green and blue light, or corresponding to yellow, cyan and magenta light. The projecting lens 15 is used for composing the color pictures formed from the liquid crystal display devices 14a, 14b and 14c and projecting the composed picture on a screen (not shown).

The light source 11 is constituted by a lamp 11a for emitting the light, and a parabolic reflecting mirror 11b for reflecting in parallel the light emitted from the lamp 11a.

The dichroic mirrors comprise a first dichroic mirror 12a for separating the light emitted from the light source 11 according to wavelength, a second dichroic mirror 12b for separating the light transmitted through the first dichroic mirror 12a according to wavelength, a third dichroic mirror 12c for composing the light transmitted through a first liquid crystal display device 14a after being reflected by the first dichroic mirror 12a and the light transmitted through a second liquid crystal display device 14b after being reflected by the second dichroic mirror 12b, and a fourth dichroic mirror 12d for composing the light composed by the third dichroic mirror 12c and the light transmitted through the second dichroic mirror 12b and a third liquid crystal display device 14c and then transmitting the composed light to a projecting lens 15.

The liquid crystal display devices 14a, 14b and 14c each comprises a pair of transparent electrodes 21a and 21b crossed with each other in the shape of stripes, a pair of orientation films 22a and 22a, liquid crystal panel 23 sealed between the pair of oriented films 22a and 22b, and polarizing plates 24 and 25 positioned on the outside of each transparent electrode for transmitting only specifically polarized light. The liquid crystal display devices 14a, 14b and 14c are positioned on a different optical path, respectively, to form the picture corresponding to R, G and B, or Y, C and M.

According to the prior art, even though light emitted from the lamp 11a is not polarized, the light reflected by the parabolic reflecting mirror 11b is partially polarized according to the reflecting angles. That is, the reflecting angle of the light reflected around the center of the parabolic reflecting mirror 11b is relatively small, but the reflecting angle of the light reflected around the circumference thereof is large so that the light undergoes partial polarization where S-polarization becomes superior to P-polarization.

FIG. 2 shows the incident state of the partial polarized light applied to a polarizing plate 24 on the liquid crystal display devices 14a, 14b or 14c (see FIGS. 1A and 1B). Here, solid lines represent an S-polarized component and dotted lines represent a P-polarized component.

When the direction of polarization of the polarizing plate 24 coincides with the arrows in FIG. 3, the transmittance ratio of the S-polarized component in the regions B and D of the polarizing plate 24 is favorable, but the transmittance ratio of the S-polarized component in the regions A and C is extremely poor. Such a difference of the transmittance causes color non-uniformity in the picture formed on the screen (not shown).

This phenomenon is especially acute with respect to the light passing the shortest optical path among the three optical paths of R, G and B or Y, C and M. For example, with reference to FIG. 1, the light reflected by the first dichroic mirror 12a, transmitted through the liquid crystal display device 14a and the third dichroic mirror 12c, reflected by the fourth dichroic mirror 12d, and then projected to the projecting lens 15, has the shortest path and exhibits a low degree of light scattering so that the color non-uniformity thereof becomes more serious.

SUMMARY OF THE INVENTION

An object of the present invention is to provide a liquid crystal projector having improved color uniformity by using phase lag plates. Specifically, according to a feature of the present invention, the light beam from the light source is first passed through a phase lag plate and only then through the liquid crystal element. In this manner, the phase lag plate introduce rotational polarization so that the S-polarized light is aligned throughout the entire beam front. Optionally, the image can be further improved by introducing a cold mirror to intercept the ultraviolet rays and a hot mirror to intercept the infrared rays.

To obtain above objects, there is provided a liquid crystal projector comprising a light source and a plurality of dichroic mirrors for transmitting/reflecting the light emitted from the light source according to wavelength. A plurality of liquid crystal display devices receive the reflected/ transmitted light from the dichroic mirror and form a color picture in response to electrical current applied thereto. A plurality of reflecting mirrors are positioned on predetermined positions in the optical paths to reflect the various light beams, and a projecting lens projects the color picture on a screen. A phase lag plate is positioned in front of at least one of the liquid crystal display devices for changing the polarizing direction of the reflected/transmitted light.

Especially, the polymer compensation films are desirably positioned on the front of each liquid crystal display device or at least on the shortest optical path, and wavelength thereof is preferably $\lambda/4$.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1A:
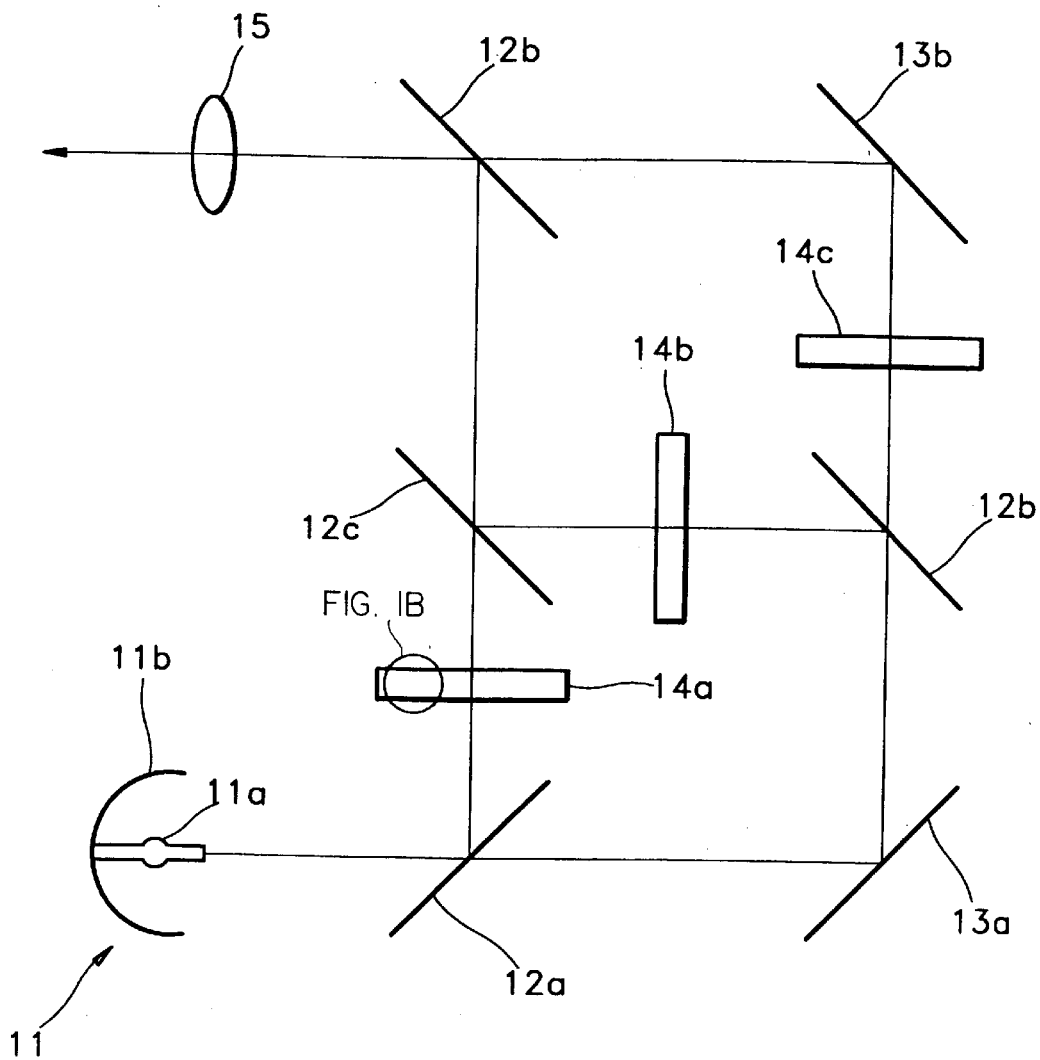
FIGS. 1A and 1B are schematic diagrams showing the optical construction of a conventional color liquid crystal projector.
Figure 1B:
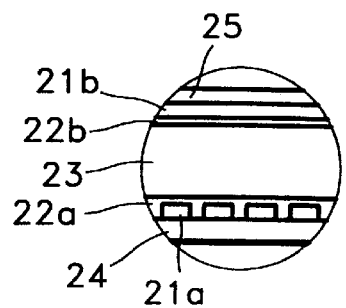
Figure 2:
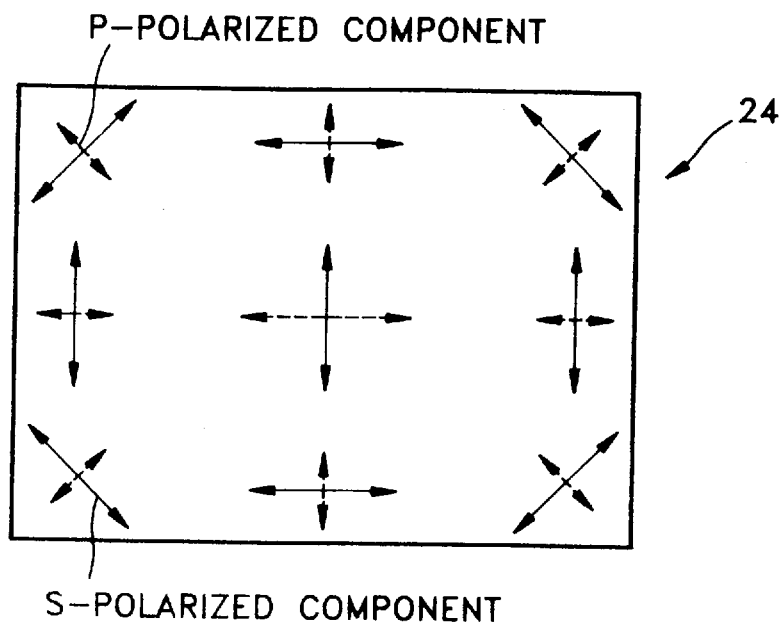
FIG. 2 is a schematic diagram showing the partially polarized state of the light emitted from the light source of the liquid crystal projector of FIG. 1A.
Figure 4:
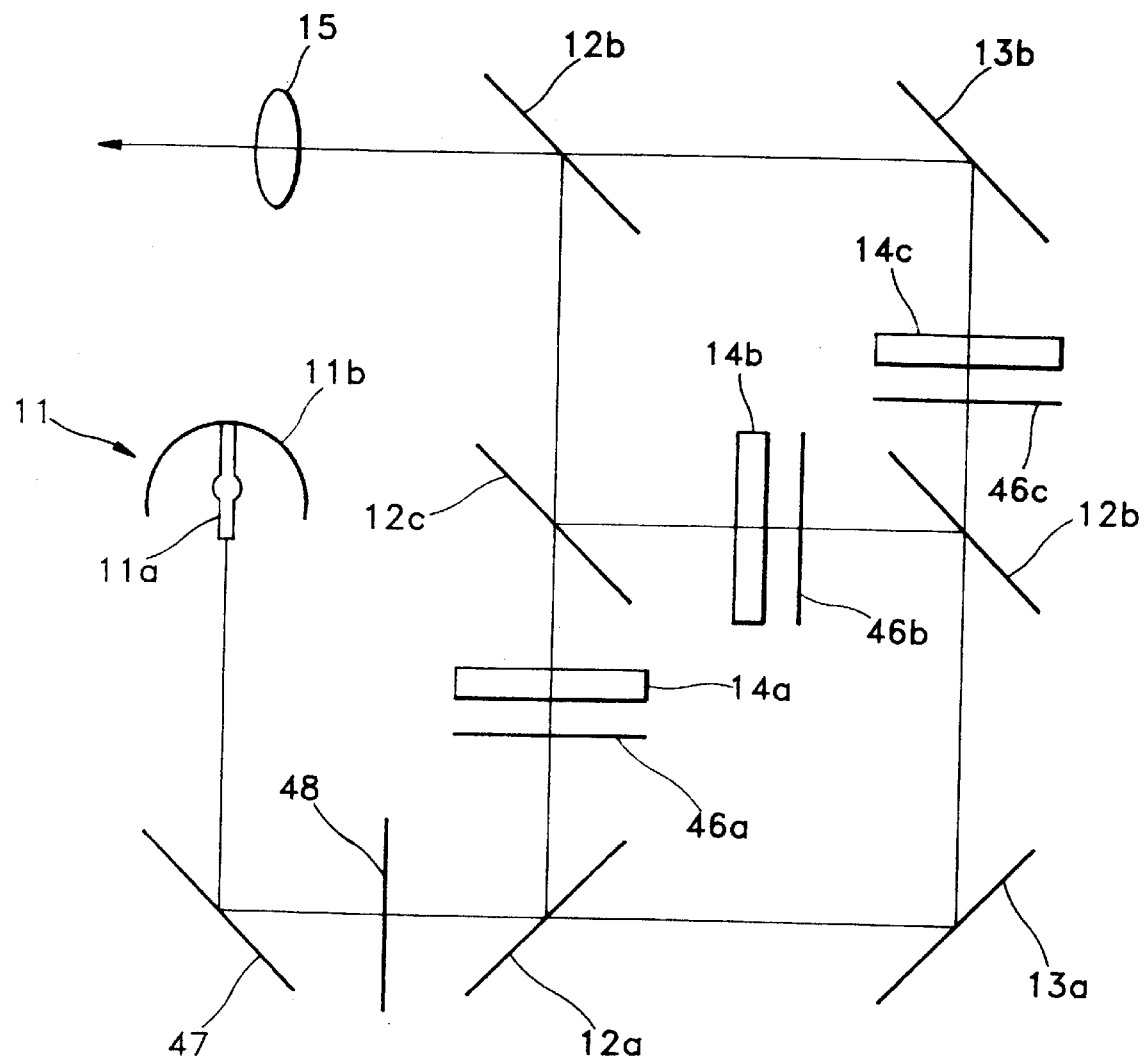
FIG. 4 is a schematic diagram showing the optical construction of a liquid crystal projector according to the present invention.

FIG. 4 shows a liquid crystal projector according to the present invention, in which the same reference indications as FIG. 1A are assigned to like elements.

In FIG. 4, the liquid crystal projector according to the present invention further comprises a plurality of phase lag plates 46a, 46b and 46c positioned on the front surface of at least one device among the liquid crystal display devices 14a, 14b and 14c, to thereby compensate the partially polarized light from the light source 11.

The phase lag plates 46a, 46b and 46c compensate the partially polarized light from the light source 11 to match the direction of polarization of the incident light of the center and that of the circumference of each liquid crystal device 14a, 14b and 14c.

The phase lag plates 46a, 46b and 46c operate on incident light by changing linear polarization into circular or elliptical polarization. For changing the incident linear polarization into circular polarization, the phase lag plates 46a, 46b and 46c are preferably λ/4-Wavelength plates.

Figure 3:
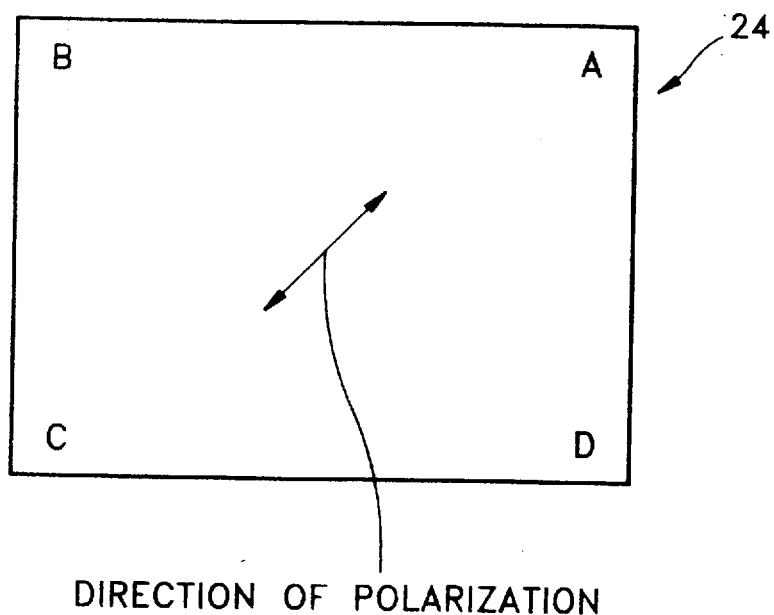
FIG. 3 is a schematic diagram showing the direction of the polarization of a polarizing plate on the liquid crystal display device of the liquid crystal projector of FIG. 1A and 1B.
Figure 5:
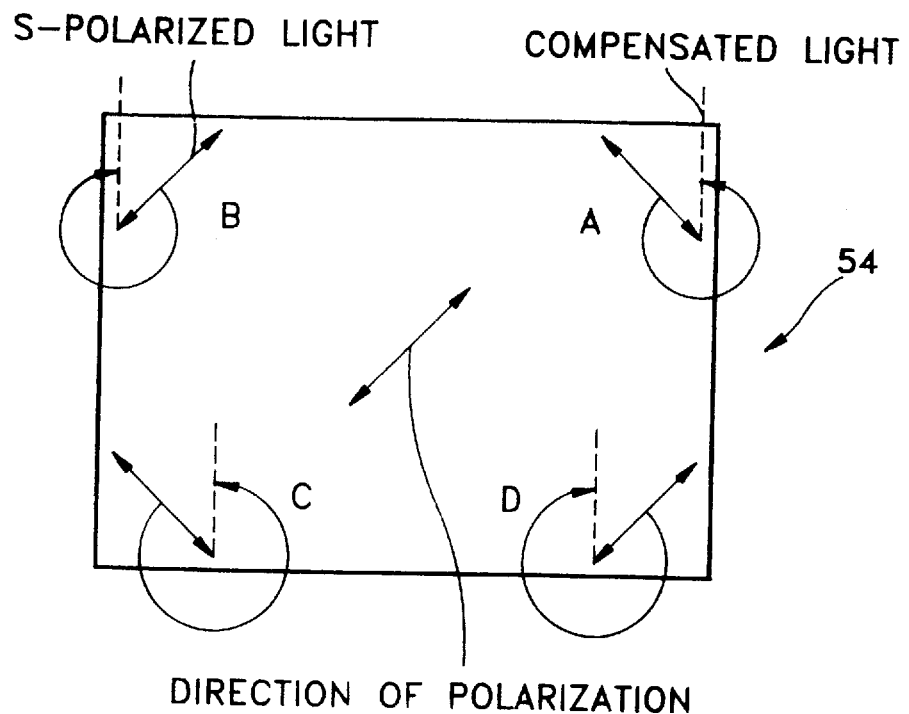
FIG. 5 is a schematic diagram showing polarization characteristics of the liquid crystal projector according to the present invention.

FIG. 5 shows the characteristic of polarization of the liquid crystal projector having the λ/4-wavelength plates, when the direction of polarization of a polarizing plate 54 on liquid crystal display devices 14a, 14b or 14c (FIG. 4) coincides with the arrows in FIG. 3.

As depicted in FIG. 5, when the linear S-polarized light parallel or perpendicular to the polarizing direction of the polarizing plate 54, reflected around the circumference of the parabolic reflecting mirror 11b (FIG. 4), is applied to the λ/4-wavelength plate, the polarizing direction of the S-polarized light is rotated by a predetermined angle. Therefore, the polarizing direction of the incident light applied to the front surface of the polarizing plate 54 becomes identical throughout the surface.

It is desirable that the phase lag plates 46a, 46b and 46c (FIG. 4) be positioned on the front surface of the liquid crystal display devices 14a, 14b and 14c, respectively. Moreover, the phase lag plates 46a, 46b, 46c should be positioned on the shortest optical path between the light source 11 (with low light scattering and apparent polarizing characteristic) and the projecting lens 15, i.e., between the first liquid crystal display device 14a and the first dichroic mirror 12a.

Moreover, the present invention may further include, as shown in FIG. 4, a cold mirror 47 positioned between the light source 11 and the first dichroic mirror 12a for intercepting the ultraviolet rays of the light from the light source 11, and a hot mirror 48 positioned between the light source 11 and the first dichroic mirror 12a for intercepting the infrared rays of the light from the light source 11.

Accordingly, the liquid crystal projector according to the present invention can prevent non-uniformity of the color of the image projected on a screen, by inserting a phase lag plate of a simple construction in the optical path between the light source and the liquid crystal display devices.

What is claimed is:

1. A liquid crystal projector comprising:

a light source;

a plurality of dichroic mirrors for selectively transmitting/reflecting the light emitted from said light source according to wavelength;

a plurality of transmissive liquid crystal display devices for receiving the reflected/transmitted light from said dichroic mirrors and forming a predetermined color picture;

a plurality of reflecting mirrors positioned on predetermined positions on optical paths for reflecting light;

a projecting lens for projecting the color picture on a screen; and a phase lag plate positioned between at least one of said plurality of transmissive liquid crystal display devices and said dichroic mirrors, for changing the polarization direction of the reflected/transmitted light so as to align the polarization of the light emitted from said light source before the light is received by said at least one of said plurality of transmissive liquid crystal display devices, wherein said phase lag plate is positioned on the shortest optical path between said light source and said projecting lens, and wherein said phase lag plate is λ/4 wavelength plate.

2. The liquid crystal projector as claimed in claim 1, further comprising at least one cold mirror for intercepting ultraviolet rays, positioned on the optical path between said light source and said dichroic mirrors.

3. The liquid crystal projector as claimed in claim 1, further comprising at least one hot mirror for intercepting infrared rays, positioned on the optical path between said light source and said dichroic mirrors.

4. The liquid crystal projector as claimed in claim 1, wherein said phase lag plate is positioned on a surface of said at least one of said liquid crystal display devices.

5. The liquid crystal projector as claimed in claimed 1, wherein said phase lag plate is positioned on a surface of said one of said liquid crystal display devices.

* * * * *